US007653192B1

(12) United States Patent
Sylvain

(10) Patent No.: US 7,653,192 B1
(45) Date of Patent: Jan. 26, 2010

(54) MULTIMEDIA AUGMENTED CONFERENCE BRIDGE

(75) Inventor: Dany Sylvain, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1435 days.

(21) Appl. No.: 10/324,755

(22) Filed: Dec. 20, 2002

(51) Int. Cl.
    *H04M 3/42* (2006.01)
(52) U.S. Cl. .......................... 379/202.01; 379/205.01; 379/207.01
(58) Field of Classification Search ............ 379/202.01, 379/205.01, 207.01; 370/260; 348/14.09
    See application file for complete search history.

(56) References Cited

U.S. PATENT DOCUMENTS

| 5,099,510 | A  | * | 3/1992  | Blinken et al. ......... 379/202.01 |
| 5,471,318 | A  | * | 11/1995 | Ahuja et al. ................ 358/400 |
| 5,689,553 | A  | * | 11/1997 | Ahuja et al. ........... 379/202.01 |
| 5,822,525 | A  | * | 10/1998 | Tafoya et al. ............... 709/204 |
| 5,909,431 | A  | * | 6/1999  | Kuthyar et al. .............. 370/260 |
| 6,236,653 | B1 | * | 5/2001  | Dalton et al. ................ 370/352 |
| 6,483,912 | B1 | * | 11/2002 | Kalmanek et al. ........... 379/219 |
| 6,501,740 | B1 | * | 12/2002 | Sun et al. .................... 370/261 |
| 6,545,697 | B1 | * | 4/2003  | Parker et al. ............. 348/14.01 |
| 6,628,767 | B1 | * | 9/2003  | Wellner et al. ......... 379/202.01 |
| 6,697,341 | B1 | * | 2/2004  | Roy ............................ 370/260 |
| 6,782,412 | B2 | * | 8/2004  | Brophy et al. ............... 709/204 |
| 6,819,752 | B2 | * | 11/2004 | Raniere et al. ......... 379/202.01 |
| 6,831,675 | B2 | * | 12/2004 | Shachar et al. ........... 348/14.08 |
| 6,839,734 | B1 | * | 1/2005  | Vega-Garcia et al. ....... 709/204 |
| 6,870,916 | B2 | * | 3/2005  | Henrikson et al. ..... 379/202.01 |
| 6,909,708 | B1 | * | 6/2005  | Krishnaswamy et al. .... 370/352 |
| 6,941,373 | B2 | * | 9/2005  | Agraharam et al. ......... 709/227 |
| 7,203,759 | B1 | * | 4/2007  | Ostermann et al. .......... 709/231 |
| 2001/0023430 | A1 | * | 9/2001  | Srinivasan ................... 709/204 |
| 2001/0056466 | A1 | * | 12/2001 | Thompson et al. .......... 709/204 |
| 2002/0103864 | A1 | * | 8/2002  | Rodman et al. ............. 709/204 |
| 2002/0122391 | A1 | * | 9/2002  | Shalit ......................... 370/260 |
| 2003/0002448 | A1 | * | 1/2003  | Laursen et al. .............. 370/261 |
| 2003/0021400 | A1 | * | 1/2003  | Grandgent et al. ..... 379/202.01 |
| 2003/0072429 | A1 | * | 4/2003  | Slobodin et al. ....... 379/202.01 |
| 2003/0158900 | A1 | * | 8/2003  | Santos ........................ 709/205 |
| 2004/0208303 | A1 | * | 10/2004 | Rajagopalan et al. .. 379/202.01 |
| 2004/0210637 | A1 | * | 10/2004 | Loveland .................... 709/204 |
| 2004/0239754 | A1 | * | 12/2004 | Shachar et al. ........... 348/14.08 |
| 2005/0053214 | A1 | * | 3/2005  | Reding et al. .......... 379/202.01 |

* cited by examiner

*Primary Examiner*—Rasha S Al Aubaidi
(74) *Attorney, Agent, or Firm*—Withrow & Terranova, P.L.L.C.

(57) ABSTRACT

The present invention provides an effective and efficient way to link multimedia sessions involving multimedia clients with a conference call involving telephony devices associated with the multimedia clients. In operation, the telephony system will recognize a call directed to an audio bridge, as well as trigger a message indicating the same. The message includes the telephony device's directory number, which is used to access an address for an associated multimedia client. The address for the multimedia client is sent to a multimedia bridge, which is associated with the audio bridge. The multimedia bridge will use the multimedia client's address to send the multimedia client the address for the multimedia bridge, addresses for other participating multimedia clients, and various types of information bearing on the multimedia aspect of the conference call.

42 Claims, 14 Drawing Sheets

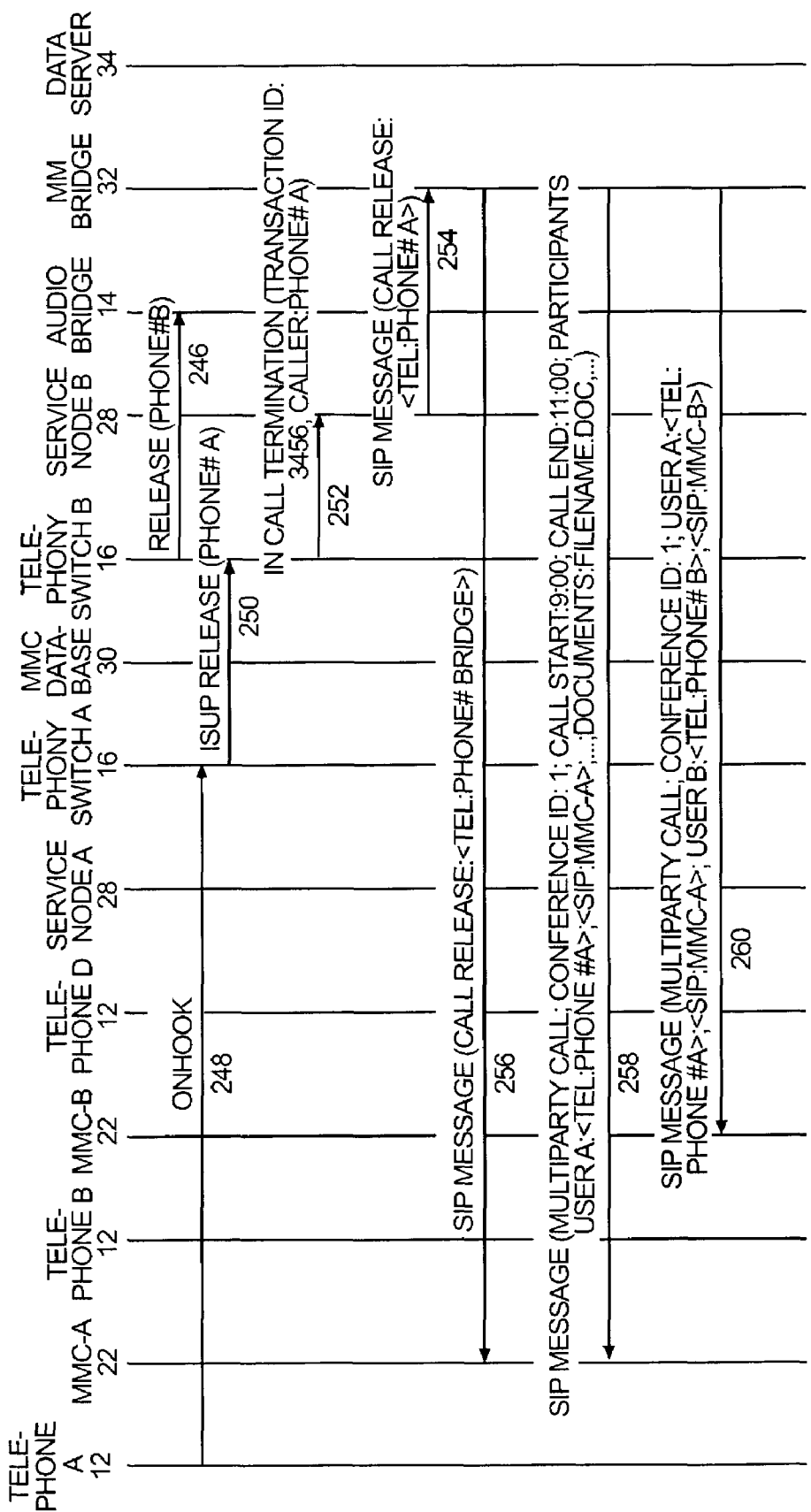

MULTIMEDIA AUGMENTED CONFERENCE BRIDGE

FIELD OF THE INVENTION

The present invention relates to telecommunications, and in particular to associating multimedia sessions with voice sessions participating in a conference.

BACKGROUND OF THE INVENTION

Given the increasing need to share multimedia information, such as files, video, and other data with conference participants during a conference call, there is a need for an efficient and easy-to-use mechanism for associating multimedia clients with telephony devices participating in the conference call. Existing techniques to add media to a conference call use parallel systems, which handle data independently of the voice session. For example, Microsoft's NetMeeting fails to link the voice and multimedia sessions, and additionally provides a very complex and hard-to-use user interface. Web-based applications severely limit the types of multimedia sessions that can be provided, and also fail to link the multimedia and voice aspects of the conference call. Accordingly, there is a need for a way to provide automatic linkage between the multimedia sessions and voice sessions for a conference call. There is a further need to provide such functionality with existing audio bridges, with little or no modification.

SUMMARY OF THE INVENTION

The present invention provides an effective and efficient way to link multimedia sessions involving multimedia clients with a conference call involving telephony devices associated with the multimedia clients. In operation, the telephony system will recognize a call directed to an audio bridge, as well as trigger a message indicating the same. The message includes the telephony device's directory number, which is used to access an address for an associated multimedia client. The address for the multimedia client is sent to a multimedia bridge, which is associated with the audio bridge. The multimedia bridge will use the multimedia client's address to send the multimedia client the address for the multimedia bridge, addresses for other participating multimedia clients, and various types of information bearing on the multimedia aspect of the conference call.

Preferably, the multimedia bridge is provided information bearing on changes in the participants to the conference call and the multimedia capabilities of each participant. When changes are recognized, the multimedia bridge will send messages alerting the other participating multimedia clients of such changes. To facilitate multimedia sessions between and with the multimedia clients, the multimedia bridge may receive requests or instructions for multimedia sessions from a multimedia client. In response, the multimedia bridge can access content for delivery to the multimedia clients based on the request, and either deliver the content or deliver an address at which the content can be accessed to the multimedia clients. The content may be ultimately stored on one of the multimedia clients, the multimedia bridge, or another device.

The multimedia sessions may include instant messaging, streaming media, file transfer, or any other type of media session wherein data is delivered to one or more of the multimedia clients. Further, the present invention provides authentication procedures for making sure a multimedia client and its user are authenticated before participating in the multimedia aspect of the conference call. Further, the multimedia clients may be configured to initiate the voice session by sending a message that is capable of triggering a call from the associated telephony device to the audio bridge.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates a communication environment according to one embodiment of the present invention.

FIGS. 2A-2G provide an exemplary communication flow according to one embodiment of the present invention.

FIGS. 3A and 3B provide a communication flow illustrating an exemplary log on process according to one embodiment of the present invention.

FIGS. 4A-4C provide a communication flow to allow a user to initiate a conference call from a multimedia client according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
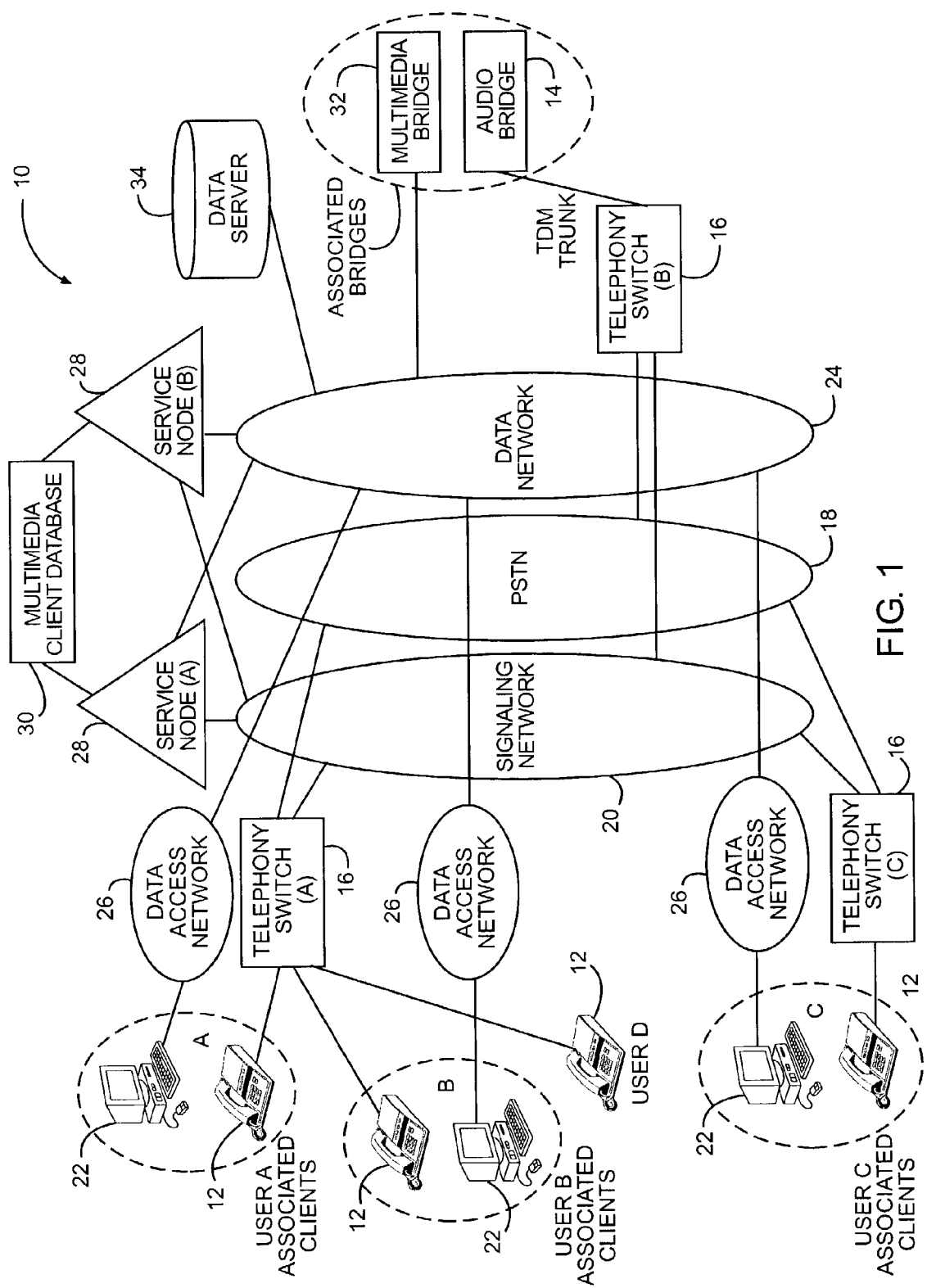
Figure 2A:
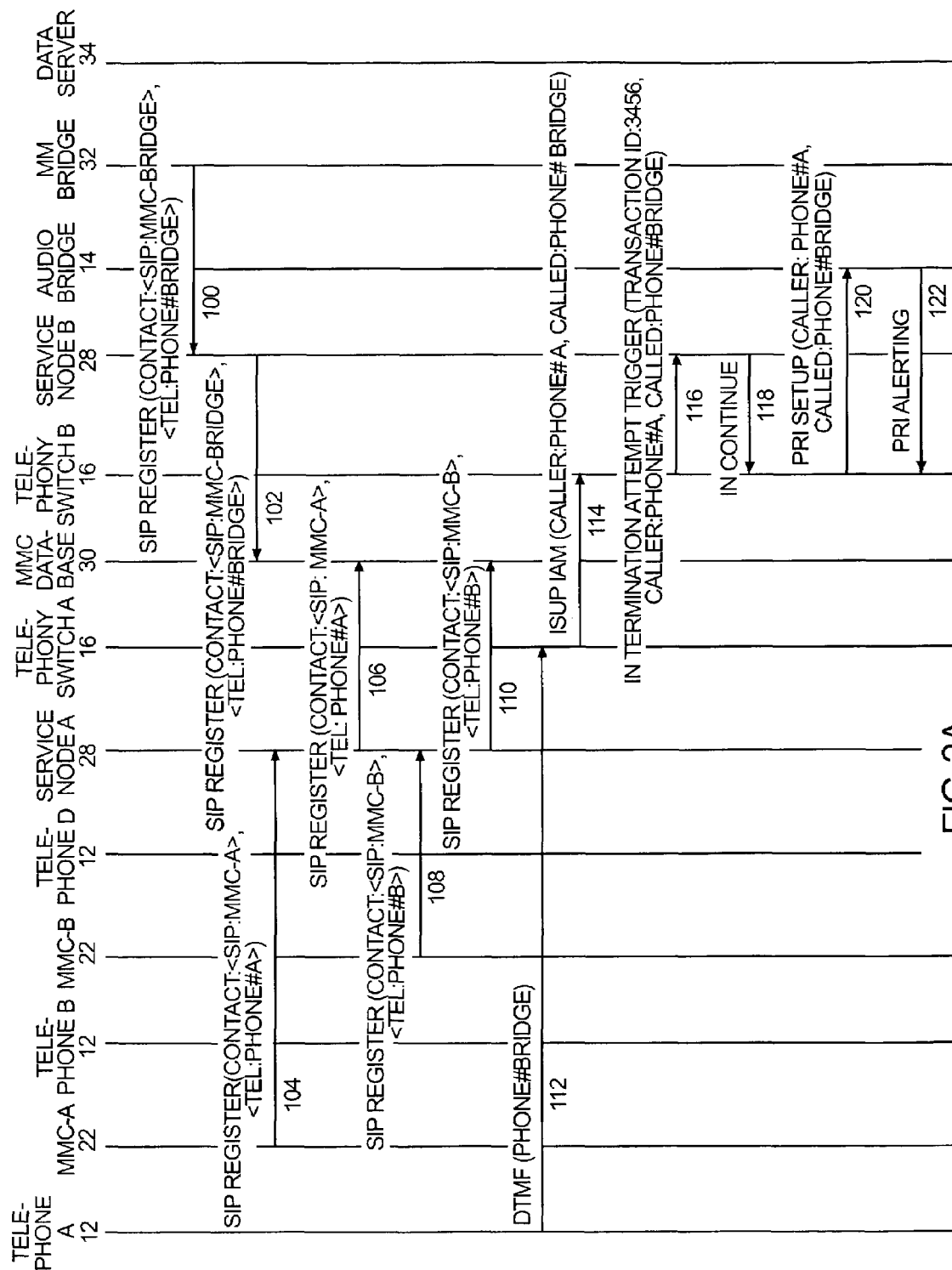
Figure 2B:
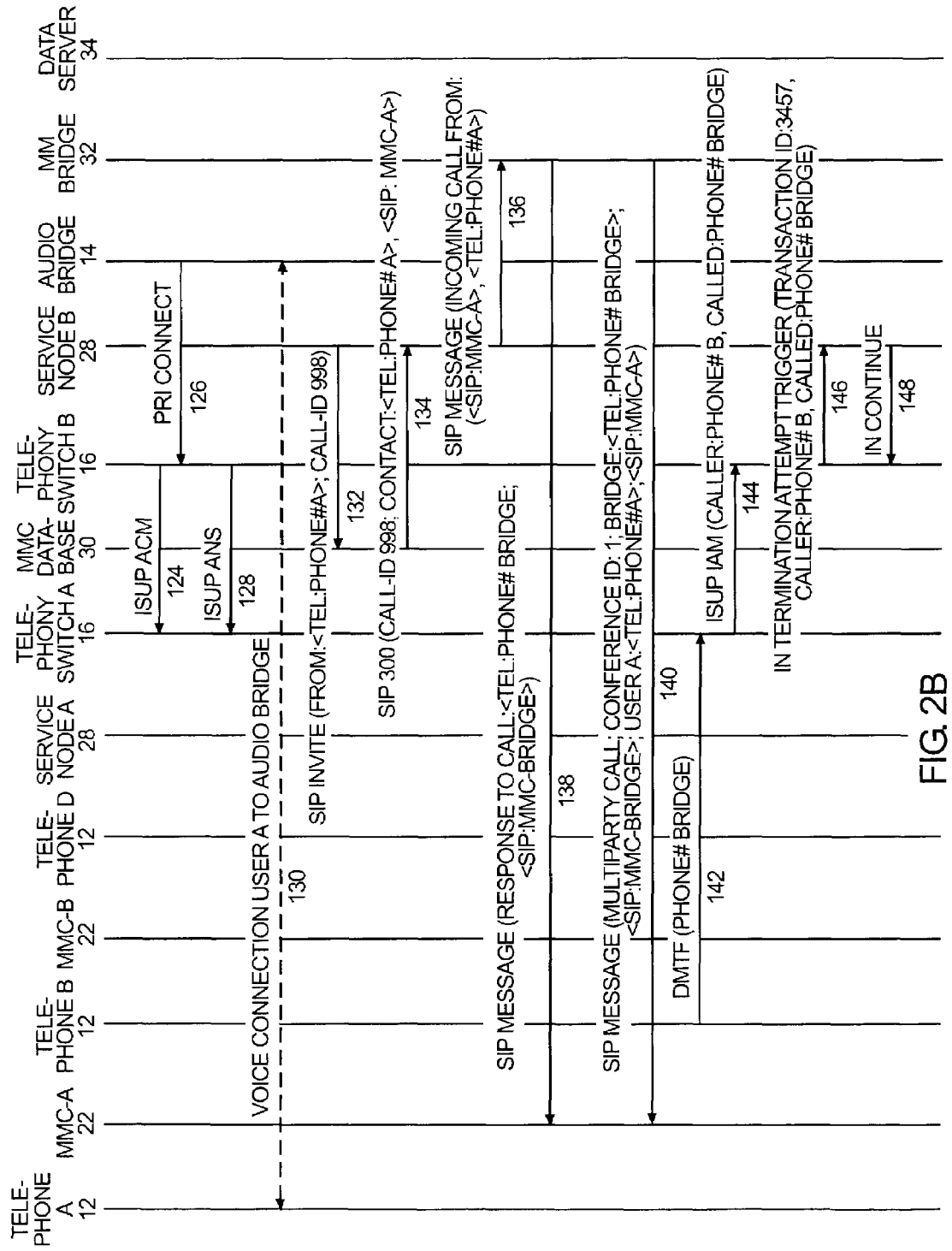
Figure 2C:
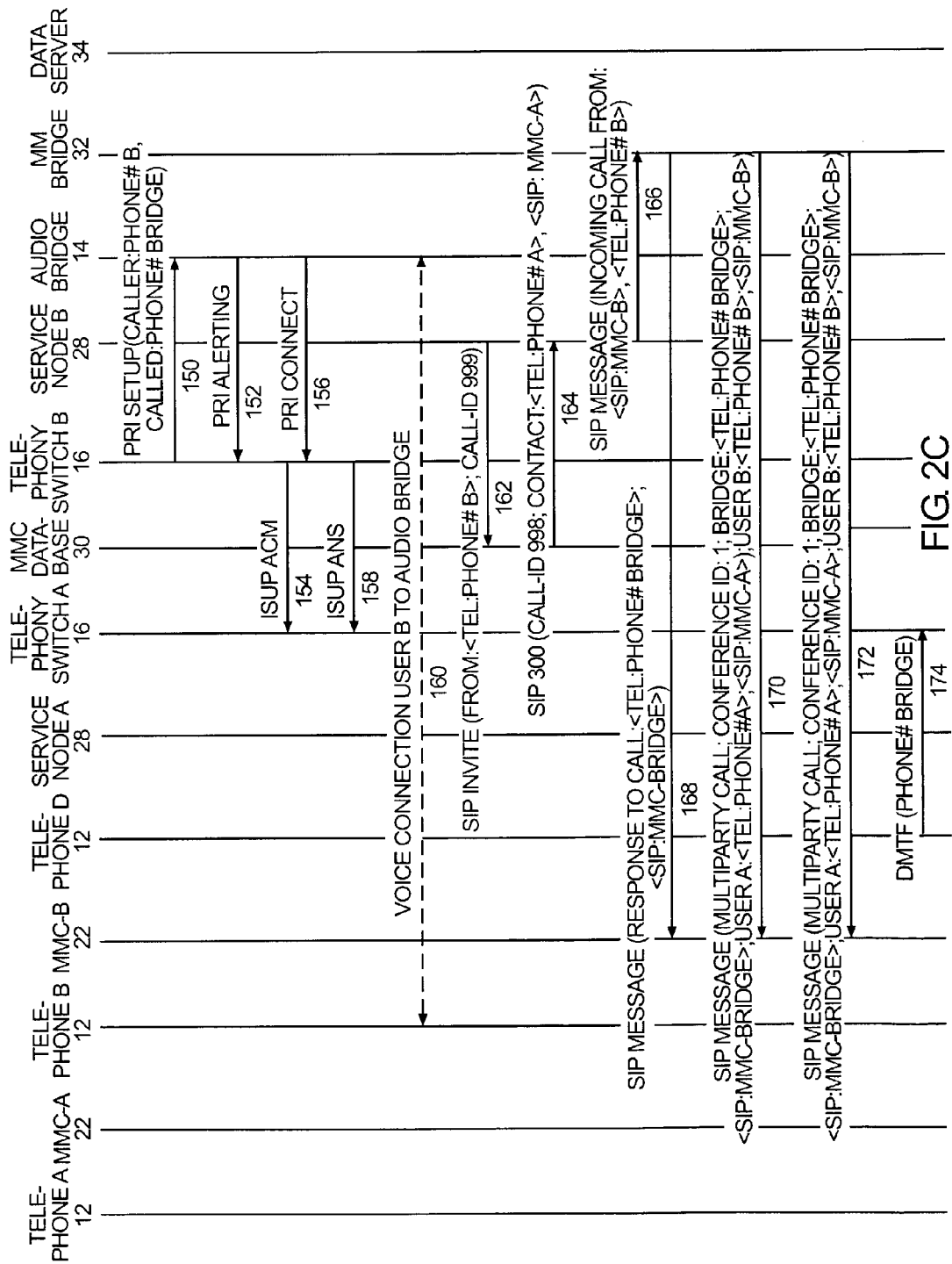
Figure 2D:
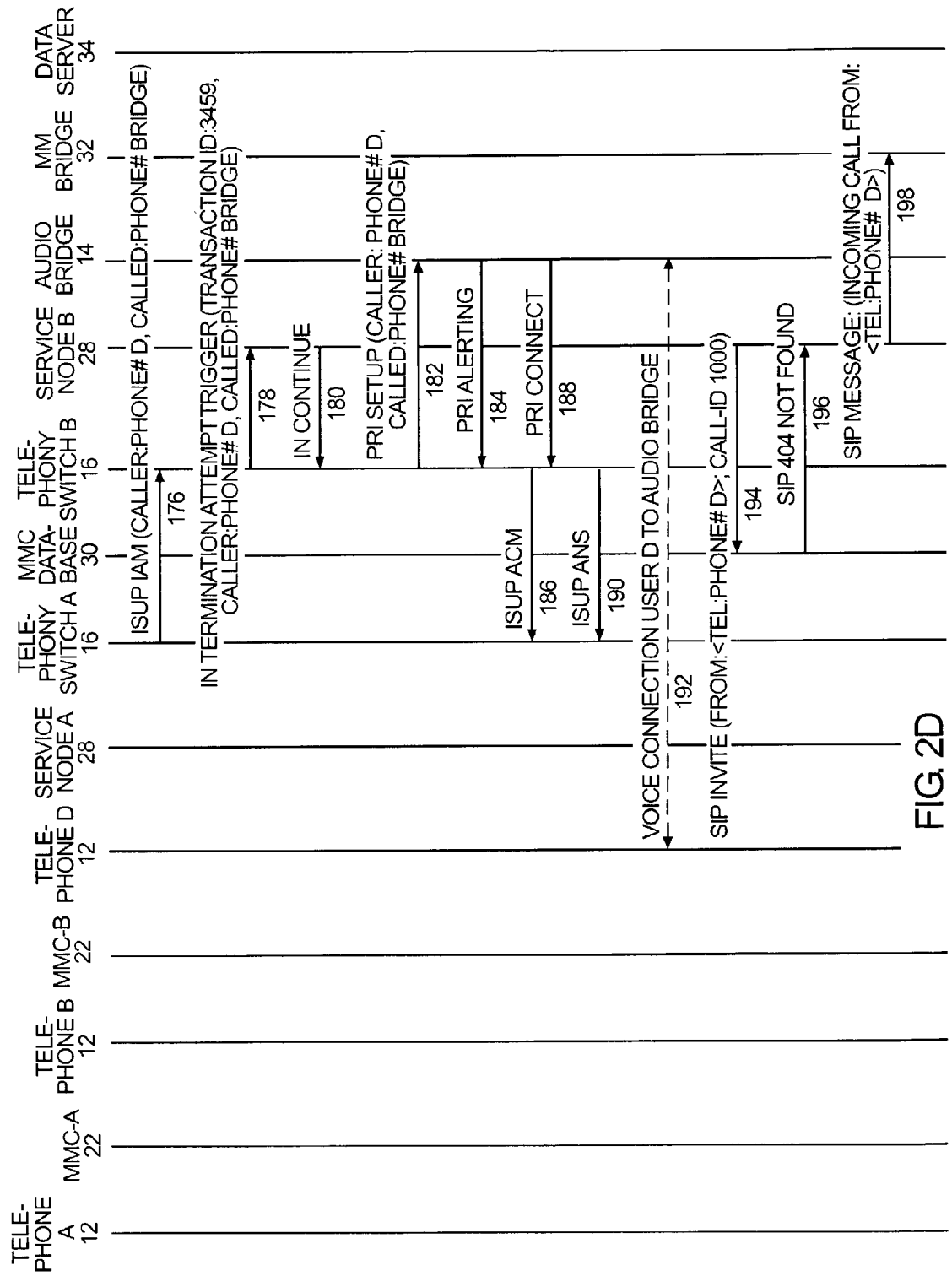
Figure 2E:
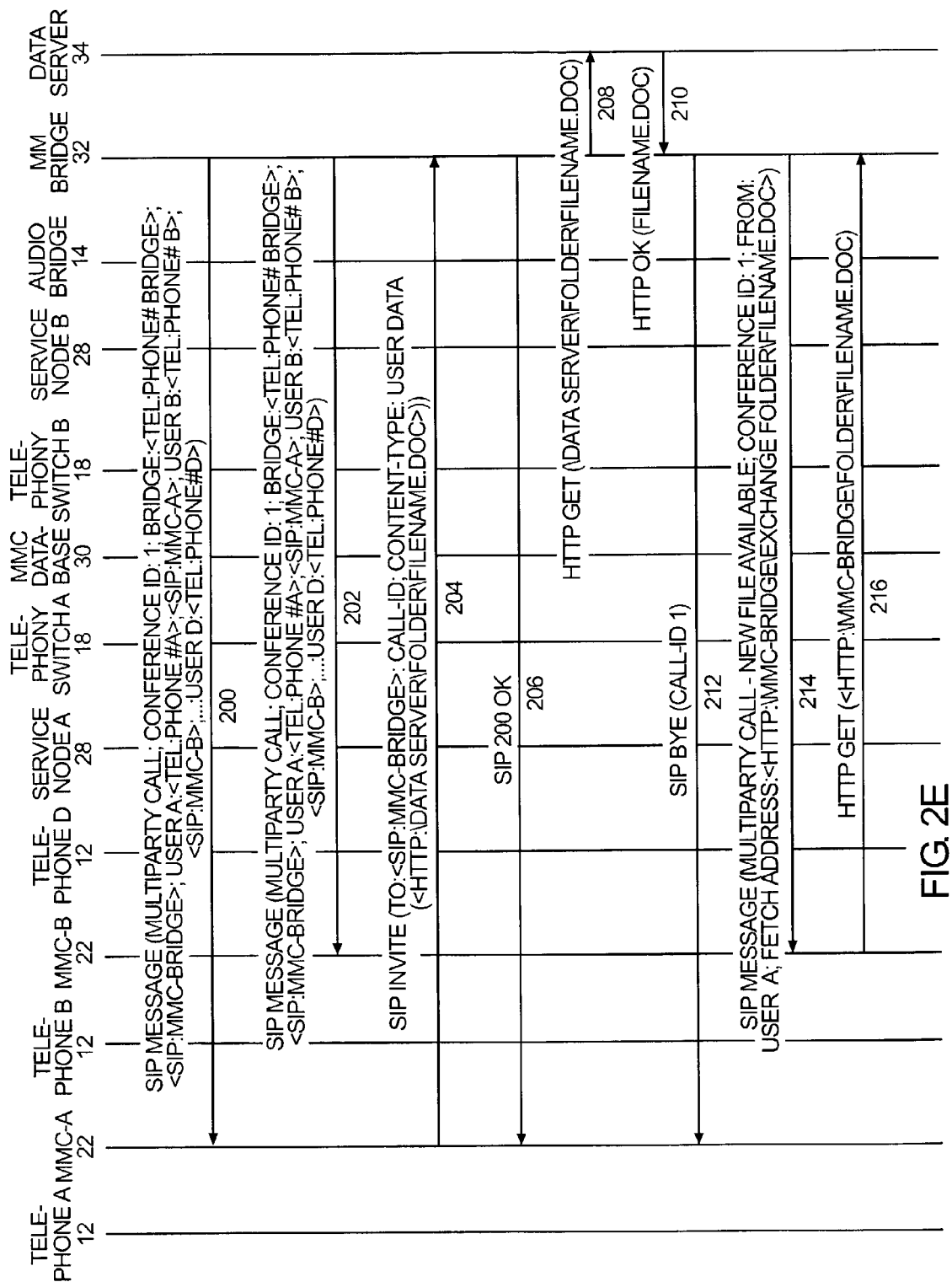
Figure 2F:
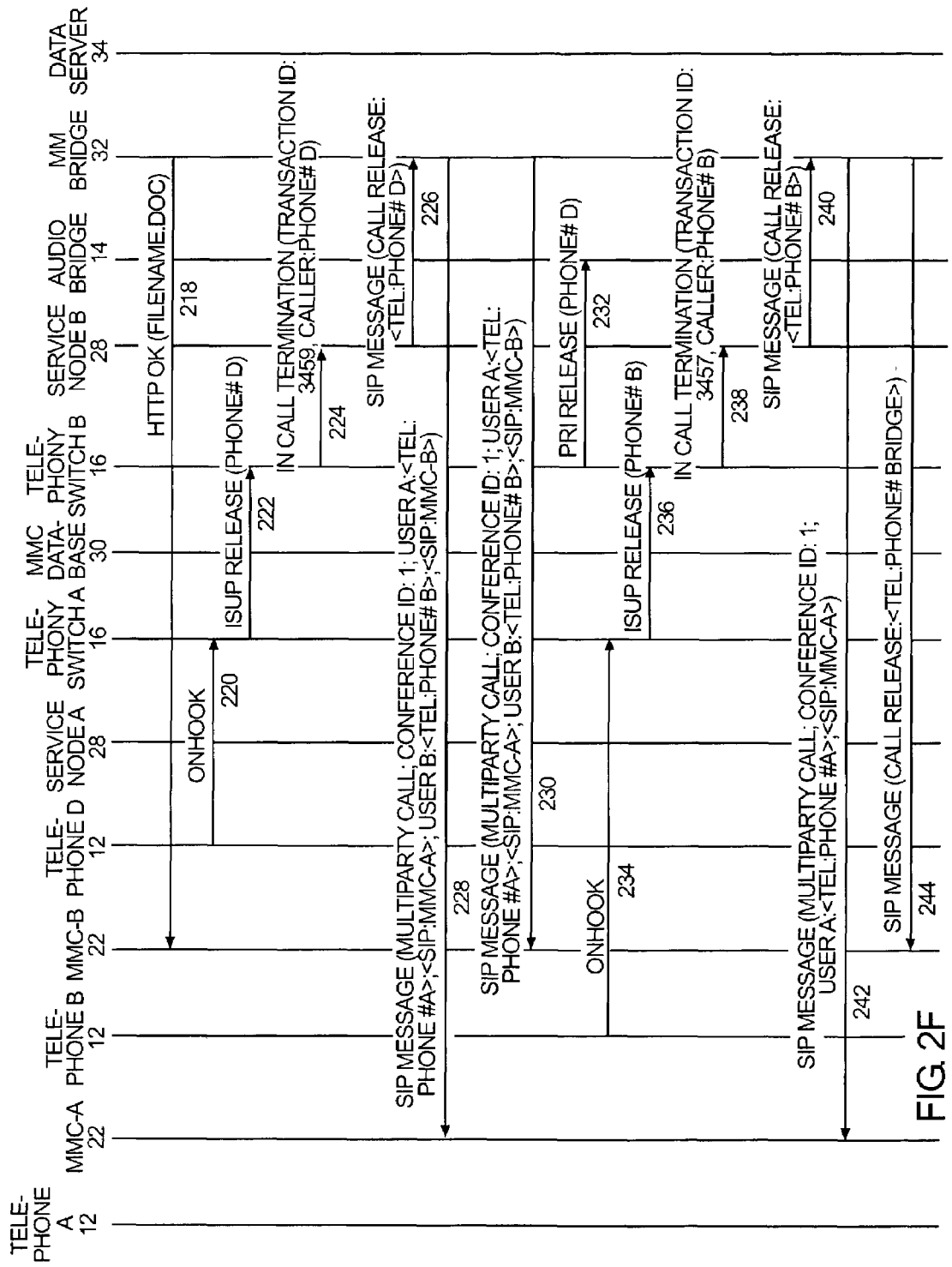

The present invention provides an efficient mechanism for associating multimedia sessions, such as streaming video, file transfer, file sharing, instant messaging sessions, and screen sharing, in association with a conference call facilitated using an audio bridge. As illustrated in FIG. 1, an exemplary communication environment 10 is provided wherein telephony devices 12, such as landline, wireless, or packet-based telephones, can dial in to an audio bridge 14, which can bridge the incoming calls from the various users and establish a conference call in traditional fashion. For the purposes of clarity and conciseness, the telephony device 12 is referred to as a telephone 12; however, those skilled in the art will recognize all of the various forms the telephony device 12 can take.

Each of the telephones 12, as well as the audio bridge 14, are supported by telephony switches 16, which in this exemplary embodiment are effectively coupled to each other via the Public Switched Telephone Network (PSTN) 18 in traditional, circuit-switched fashion, but those skilled in the art will recognize analogous packet-based solutions. In association with the PSTN 18, a signaling network 20, such as the signaling systems 7 (SS7) intelligent network, is also associated with the telephony switches 16 to facilitate the establishment of telephony calls between the various telephones 12 and the audio bridge 14 via the PSTN 18.

In association with select telephones 12, users may have a multimedia client 22, which may be afforded via a personal computer or any other computing device capable of facilitating some type of non-voice media session in a single or continuous fashion. The telephones 12 and their associated multimedia clients 22 will form associated clients for the particular user. The multimedia clients 22 have access to other devices via a data network 24 and local data access networks 26. For those users having an associated telephone 12 and multimedia client 22, a service node 28 is used to control the association between a user's telephone 12 and multimedia client 22. As such, the service node 28 is configured to interact with the telephony switches 16 via the signaling network 20, as well as with the multimedia clients 22 via the data network 24 and local data access networks 26. Preferably, the service node 28 has access to a multimedia client database 30, wherein information provided in association with the establishment of a telephone call, such as the directory number (DN) for a telephone 12, can be used to identify an address, which may include any available port information, for the multimedia client 22 associated with a particular telephone 12. As such, the multimedia client database 30 will preferably associate an address for a multimedia client 22 and a directory number for a telephone 12, which are both associated with a given user.

In a similar fashion, a multimedia bridge 32 is associated with the audio bridge 14, such that conference calls handled by the audio bridge 14 can be associated with multimedia sessions with multimedia clients 22 associated with the telephones 12 participating in the conference call. Accordingly, a service node 28 is also used to provide the association between the multimedia bridge 32 and the audio bridge 14 by associating an address for the multimedia bridge 32 with a particular conference call. The association can be based on a conference call identification number or an actual directory number, depending on the type of audio bridge 14. The association may be kept at the multimedia client database 30 or at another place in the network, including the service node 28. During a multimedia-capable conference, data can be transferred or distributed amongst the participating multimedia clients 22 from each other or from a remote data server 34, as desired.

From the above configuration, service nodes 28 are used to provide an association between multimedia clients 22 and telephones 12 as well as the multimedia bridge 32 and the audio bridge 14. In general, the establishment of a voice session or conference call will trigger the service node 28 for the multimedia bridge 32 to find the address for the multimedia client 22 associated with the conference participants, and send the address for the multimedia bridge 32 to the addresses for the multimedia clients 22. The multimedia bridge 32 will make sure each of the multimedia clients 22 knows the address for the other multimedia clients 22, such that each may provide information to the other multimedia clients 22 directly or through the multimedia bridge 32. Further, the multimedia bridge 32 will keep track of the voice participants, and alert other participants via their multimedia clients 22 of changes in status, such as participants leaving the conference.

Further details and capabilities are highlighted in the following communication flows, which begin with the communication flow of FIGS. 2A-2G, wherein an exemplary multimedia-capable conference is established between users A, B, and D. In an effort to reduce redundancy, user C is not included in the conference. Those skilled in the art will recognize that user C could be added to the conference in a manner similar to adding users A and B. In the following call flow, users A and B have multimedia clients A and B (22) associated with telephones A and B (12), while user D does not have a multimedia client 22, and only participates via telephone D (12). Prior to facilitating a multimedia-capable conference, multimedia clients A and B (22) and the multimedia bridge 32 should be registered with respective service nodes A and B (28) and the multimedia client database 30. Assume that service node A (28) supports multimedia clients A and B (22), while service node B (28) supports the multimedia bridge 32. Further assume that the multimedia client database 30 will keep track of the association between a directory number and an address for the corresponding telephone 12 and multimedia client 22. For the present example, the Session Initiation Protocol (SIP) is used to facilitate communications between the various service nodes 28, the multimedia clients 22, the multimedia bridge 32, and the multimedia client database 30. The service nodes 28 are also preferably configured to interact with the corresponding telephony switches A, B, and C (16) using traditional intelligent network (IN) protocols. Notably, a messaging translator can be provided between the service nodes 28 and the respective telephony switches 16 to facilitate the interaction therebetween. Other forms of interactions with the telephony switches 16 could also be used, such as Computer Telephony Interface (CTI), Integrated Services User Protocol (ISUP), Primary Rate Interface (PRI) or Session Initiation Protocol (SIP).

Although many communication protocols may be used to facilitate communications, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 3261: Session Initiation Protocol, which is incorporated herein by reference in its entirety. For additional information attention is directed to U.S. patent application Ser. Nos. 10/028,510 filed Dec. 20, 2001, 10/193,885 filed Jul. 12, 2002, 10/262,393 filed Oct. 1, 2002, 10/261,577 filed Oct. 1, 2002, and 10/262,288 filed Oct. 1, 2002, which are incorporated herein by reference in their entireties.

Initially, the multimedia bridge 32 will register with service node B (28) by sending a SIP REGISTER message to service node B (28) providing the address for the multimedia bridge 32 and the telephone number or conference IDs of the audio bridge 14 associated therewith (step 100). Service node B (28) will send a similar SIP REGISTER message to the multimedia client database 30 to register this association (step 102). Similarly, multimedia client A (22) will send a SIP REGISTER messaging identifying its address and the associated directory number for telephone A (12) to service node A (28) (step 104), which will send a similar SIP REGISTER message to the multimedia client database 30 to provide the association of telephone A (12) and multimedia client A (22) for user A (step 106). Multimedia client B (22) will also send a SIP REGISTER message identifying its address and directory number for associated telephone B (12) to service node A (28) (step 108), which will send a similar SIP REGISTER message to the multimedia client database 30 to provide the association of telephone B (12) and multimedia client B (22) (step 110).

When initiating a conference call, user A can dial the telephone number of the audio bridge 14 for the conference. As such, telephone A (12) will send the dual tone multifrequency (DTMF) digits representing the directory number for the audio bridge 14 to associated telephony switch A (16)

(step 112), which will trigger an ISUP initial address message (IAM) to telephony switch B (16) in traditional fashion (step 114). The ISUP IAM message will identify the caller's directory number, which is the directory number for telephone A (12), and the called party's directory number, which is the directory number for the audio bridge 14. Preferably, telephony switch B (16) is provisioned to provide an IN termination attempt trigger to service node B (28) when a call is directed to the audio bridge 14 (step 116). The termination attempt trigger will preferably include the transaction ID identifying the call, as well as the directory numbers for telephone A (12) and the audio bridge 14. Service node B (28) will respond by sending an IN continue message back to telephony switch B (16) (step 118), which will take the necessary steps to establish a voice session between telephone A (12) and the audio bridge 14 via telephony switches A and B (16).

As an example, telephony switch B (16) can send a Primary Rate Interface (PRI) setup message to the audio bridge 14 identifying the directory number for telephone A (12) and the directory number for audio bridge 14 (step 120). In response, the audio bridge 14 will send a PRI alerting message back to telephony switch B (16) (step 122), which will send an ISUIP address complete message (ACM) to telephony switch A (16) (step 124). Once the audio bridge 14 accepts the call, it will send a PRI connect message to telephony switch B (16) (step 126), which will send an ISUP answer (ANS) message to telephony switch A (16) (step 128). This effectively establishes a voice connection between telephone A (12) and the audio bridge 14 via telephony switches A and B (16) (step 130).

In the meantime, service node B (28) will access the multimedia client database 30 to obtain the address for multimedia client A (22). In a SIP environment, service node B (28) will send a SIP INVITE message to the multimedia client database 30 with a call identifier and most importantly, the directory number for telephone A (12) (step 132). The multimedia client database 30 will identify the address for multimedia client A (22) based on the directory number for telephone A (12), and will send a SIP 300 message back to service node B (28) including the address for multimedia client A (22), and preferably the directory number for telephone A (12) and the call identifier (step 134). The SIP 300 message is effectively a redirection message used in the SIP protocol to respond to SIP INVITE messages when the session should be redirected to another device. Next, service node B (28) will send a SIP MESSAGE message identifying the directory number for telephone A (12) and the address for multimedia client A (22) to the multimedia bridge 32 (step 136).

At this point, the multimedia bridge 32 will recognize that user A is the initial party to the conference, and as such, will send a SIP MESSAGE message including the address for the multimedia bridge 32, and preferably the telephone number for the audio bridge 14 to multimedia client A (22) (step 138). Recognizing a change in the conference status, the multimedia bridge 32 will send a SIP MESSAGE message to multimedia client A (22) identifying the active participants in the call (step 140). Since user A is the only participant, the SIP MESSAGE message will indicate that a multi-party call has been placed with a conference ID, and identify the participating users, which at this point is user A. As such, the SIP MESSAGE message will include the directory numbers for telephone A (12) and multimedia client A (22), and preferably the directory number for the audio bridge 14 and the address for the multimedia bridge 32. At this point, multimedia client A (22) can recognize that user A is the first person to the conference.

At this point, assume that user B picks up telephone B (12) and dials the directory number for the conference provided by the audio bridge 14. As such, telephone B (12) will send DTMF digits for the directory number for the audio bridge 14 to telephony switch A (16) (step 142), which will send an ISUP IAM message to telephony switch B (16) identifying the caller as having the directory number for telephone B (12) and the called party as having the directory number for the audio bridge 14 (step 144). Telephony switch B (16) is provisioned to send an IN termination attempt trigger with a transaction ID and identifying the directory numbers for telephone B (12) and the audio bridge 14 to service node B (28) (step 146). Service node B (28) will initially respond with an IN continue message sent to telephony switch B (16) (step 148), which will send a PRI setup message to the audio bridge 14 identifying the directory numbers for telephone B (12) and the audio bridge 14 (step 150). The audio bridge 14 will begin setting up the call by sending a PRI alerting message back to telephony switch B (16) (step 152), which will forward an ISUP ACM message to telephony switch A (16) (step 154). Once the audio bridge 14 establishes the connection, it will send a PRI connect message to telephony switch B (16) (step 156), which will send an ISUP ANS message to telephony switch A (16) (step 158). At this point, a voice connection is established between telephone B (12) and the audio bridge 14 via telephony switches A and B (16) (step 160).

In the meantime, service node B (28) will also send a SIP INVITE message to the multimedia client database 30 identifying the directory number for telephone B (12) along with a call identification number (step 162). As above, the multimedia client database 30 will send a SIP 300 message providing the address for multimedia client B (22) along with a directory number for telephone B (12) to service node B (28) (step 164). In response, service node B (28) will send a SIP MESSAGE message to the multimedia bridge 32 including the address for multimedia client B (22) and the directory number for telephone B (12) (step 166). The multimedia bridge 32 will send a SIP MESSAGE message to multimedia client B (22) identifying the directory number for the audio bridge 14 as well as the address for the multimedia bridge 32 (step 168). Additionally, the multimedia bridge 32 will send SIP MESSAGE messages to both multimedia client A (22) and multimedia client B (22) identifying the active participants in the conference (steps 170 and 172). The SIP MESSAGE messages will include the directory numbers for telephones A and B (12) in association with the addresses for multimedia clients A and B (22), along with the conference ID and an indication that it is a multimedia call.

Next, assume that user D dials into the conference by dialing the directory number for the audio bridge 14. In response, telephone D (12) will send DTMF tones corresponding to the directory number for the audio bridge 14 to telephony switch A (16) (step 174), which will send an ISUP IAM message to telephony switch B (16) (step 176). The ISUP IAM message will include the directory number for the caller's telephone, telephone D, as well as the directory number for the called entity, the audio bridge 14. Telephony switch B (16) will send an IN termination attempt trigger identifying the directory numbers for telephone D (12) and the audio bridge 14 to service node B (28) (step 178), which will respond by sending an IN continue message back to telephony switch B (16) (step 180). Telephony switch B (16) will send a PRI setup message to the audio bridge 14 (step 182), which will respond with a PRI alerting message (step 184). Telephony switch B (16) will then send an ISUP ACM message to telephony switch A (16) (step 186). The audio bridge 14, upon making the connection for telephone D (12), will send a PRI connect message to telephony switch B (16) (step 188), which will send an ISUP ANS message to telephony switch A (16) (step 190). At this point, a voice connection between telephone D (12) and the audio bridge 14 via telephony switches A and B (16) is established (step 192).

In the meantime, service node B (28) will send a SIP INVITE message to the multimedia client database 30 to find an address for the multimedia client 22 associated with telephone D (12) (step 194). The INVITE message will include the directory number for telephone D (12) along with a call identification. The multimedia client database 30 will search for an associated multimedia client 22 for telephone D (12), but will not find one. As such, a SIP 404 not found message is returned to service node B (28) (step 196). Service node B (28) will send a SIP MESSAGE message indicating that there is an incoming call from telephone D (12) to the multimedia bridge 32 (step 198). The multimedia bridge 32 will recognize that there is no associated multimedia client 22 for user D, since the SIP MESSAGE message from service node B (28) does not identify an address for an associated multimedia client 22.

Next, the multimedia bridge 32 will update multimedia clients A and B (22) to indicate that user D has joined the conference. Accordingly, the multimedia bridge 32 will send SIP MESSAGE messages to multimedia clients A and B (22) identifying the directory numbers for telephones A, B, and D (12) and the addresses for multimedia clients A and B (22), along with the conference ID (steps 200 and 202). At this point, voice connections are established between each of telephones A, B, and D (12) and the audio bridge 14, and preferably, the audio bridge 14 has connected each of these calls such that a conference may take place. Further, each of multimedia clients A and B (22), as well as the multimedia bridge 32, have the addresses for each other, such that multimedia sessions may take place therebetween in any fashion desired.

As an example, assume that user A intends to initiate a file distribution multimedia session to the participating users that have multimedia clients 22 associated with them. As such, multimedia client A (22) will send a SIP INVITE message to the multimedia bridge 32 identifying the conference and the type of INVITE message, which in this case is a data file located at http:\Data Server\Folder\Filename.doc, to the multimedia bridge 32 (step 204). The multimedia bridge 32 will respond to multimedia client A (22) by sending a SIP 200 OK message (step 206), as well as initiating an HTTP GET message to get the document from the data server 34 (step 208). The data server 34 will respond to the HTTP GET message with an HTTP OK message providing the document Filename.doc to the multimedia bridge 32 (step 210). The multimedia bridge 32 will send a SIP BYE message with the call identifier to multimedia client A (22) indicating that the file was successfully accessed (step 212). The multimedia bridge 32 will also send a SIP MESSAGE message to multimedia client B (22), and preferably any other multimedia clients 22 that are a party to the conference, indicating that a new file is available in relation to the conference, and that the new file is from user A (step 214). Preferably, the SIP MESSAGE message will include an address at the multimedia bridge 32 where the data Filename.doc is stored. If user B wishes to view the data, user B will instruct multimedia client B (22) to send an HTTP GET message to the multimedia bridge 32 to request the data Filename.doc from the address at the multimedia bridge 32 where it is stored (step 216). The multimedia bridge 32 will respond by sending an HTTP OK message with the data Filename.doc to multimedia client B (22) (step 218). Thus, the distribution of files is easily achieved in association with a conference call. Further, the data server 34 may be used to store the files, but those skilled in the art will recognize that the files may be stored on and addressed at either of the multimedia clients A or B (22).

At this point, assume that user D hangs up telephone D (12), which initiates an onhook indication from telephone D (12) to telephony switch A (16) (step 220). Telephony switch A (16) will then send an ISUP release message identifying the directory number for telephone D to telephony switch B (16) (step 222), which will send an IN call termination trigger to service node B (28) (step 224). The IN call termination trigger will include a transaction ID and the directory number for telephone D (12). Service node B (28) will send a SIP MESSAGE message to the multimedia bridge 32 indicating that the call to telephone D (12) has been released (step 226). At this point, the multimedia bridge 32 will recognize a change in the state of the conference, and update multimedia clients A and B (22) of the change by sending SIP MESSAGE messages to multimedia clients A and B (22) (steps 228 and 230). The SIP MESSAGE messages will include the directory numbers for telephones A and B (12) and the addresses for multimedia clients A and B (22). The absence of the directory number for telephone D (12) will alert multimedia clients A and B (22) that user D is no longer participating in the conference.

In response to the ISUP release message of step 222, telephony switch B (16) will send a PRI release message to the audio bridge 14 identifying the directory number for telephone D (12) (step 232). The audio bridge 14 will then end the call associated with telephone D (12). Next, assume that user B hangs up telephone B (12) causing it to send an onhook indication to telephony switch A (16) (step 234), which will send an ISUP release message identifying the directory number for telephone B (12) to telephony switch B (16) (step 236). Telephony switch B (16) will send an IN call termination message to service node B (28) with the transaction ID and the directory number for telephone B (12) (step 238). Service node B (28) will send a SIP MESSAGE message indicating a call release for telephone B (12) to the multimedia bridge 32 (step 240). Again, the multimedia bridge 32 will recognize a change in conference status, and take the necessary steps to update multimedia clients A and B (22) of the change. In this case, only user A remains, and as such, the SIP MESSAGE message sent to multimedia client A (22) only identifies the directory number for telephone A (12) and the address for multimedia client A (22), which indicates that user B is now out of the conference (step 242). The SIP MESSAGE message to multimedia client B (22) indicates that the call to the audio bridge 14 has been released (step 244). In the meantime, telephony switch B (16) will send a release message identifying the directory number for telephone B (12) to the audio bridge 14 to end the audio session associated with the audio bridge 14 (step 246).

Finally, user A will hang up telephone A (12), which will result in an onhook indication being sent from telephone A (12) to telephony switch A (16) (step 248). Telephony switch A (16) will send an ISUP release message to telephony switch B (16) identifying the directory number for telephone A (12) (step 250). Telephony switch B (16) will send an IN call termination trigger to service node B (28) identifying the directory number for telephone A (12) to indicate that user A has hung up telephone A (12) (step 252). Service node B (28) will send a SIP MESSAGE message to the multimedia bridge 32 identifying a call release associated with telephone A (12) (step 254). To finalize the multimedia aspect of the conference and provide a summary thereof, the multimedia bridge 32 will send a SIP MESSAGE message to multimedia client A (22) indicating that it has been released from the audio bridge 14 (step 256), and send SIP MESSAGE messages to both multimedia clients A and B (22), and preferably all multimedia clients 22 that were party to the conference, identifying the conference, the participants, the multimedia sessions associated therewith, and preferably the beginning and end of the calls for each of the participants or the overall conference itself (steps 258 and 260).

Figure 3A:
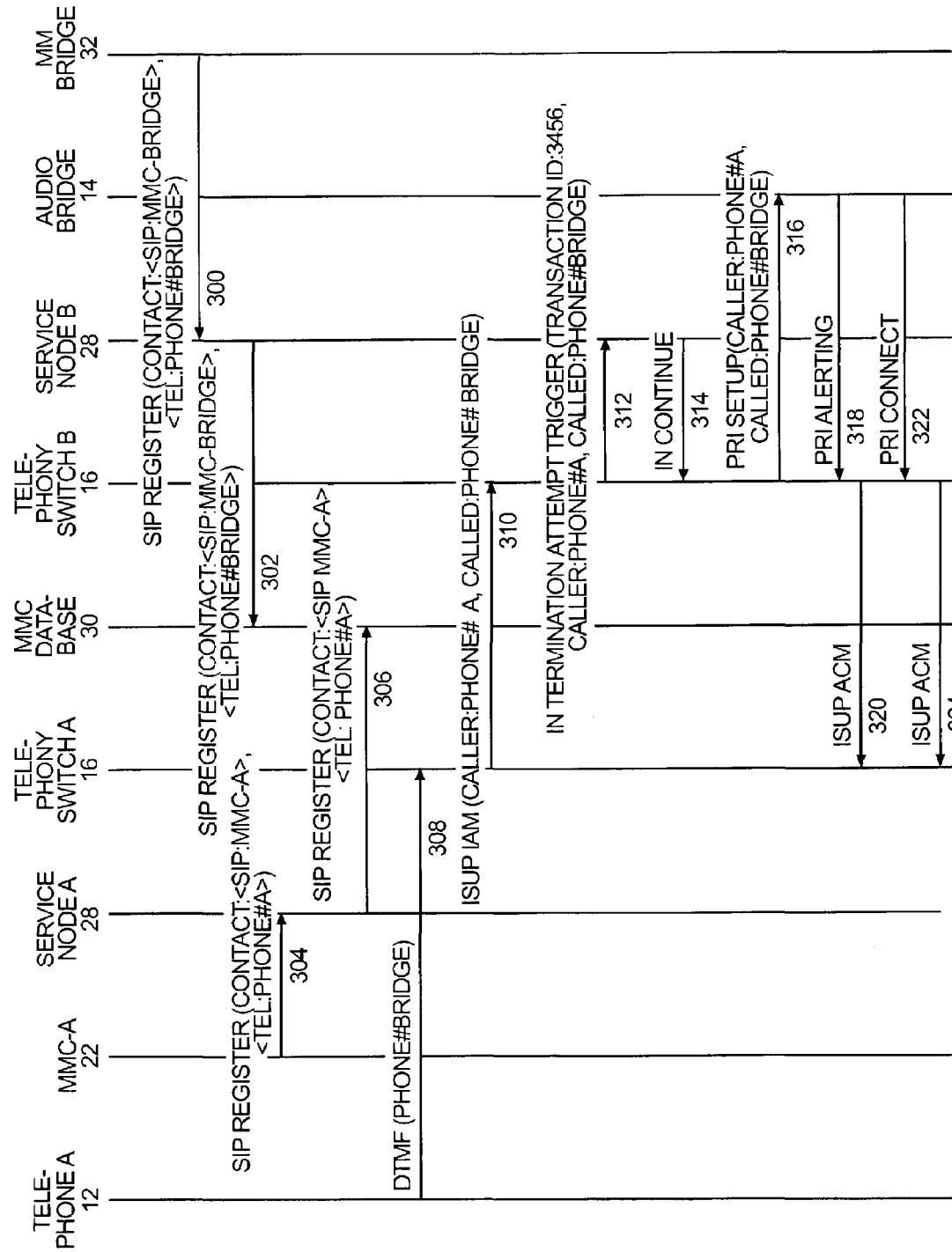
Figure 3B:
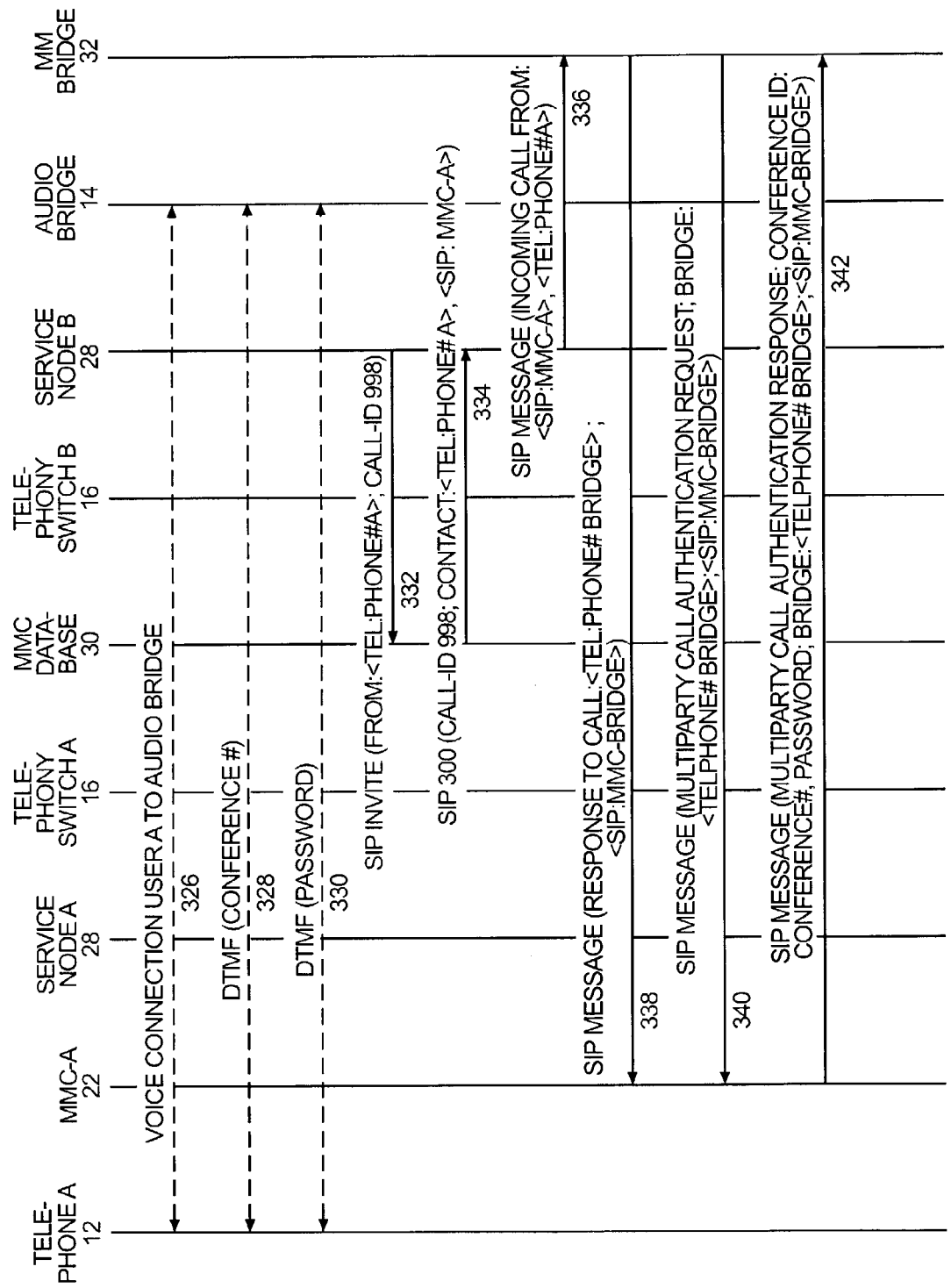

The present invention also provides an authentication process for the multimedia aspect of the conference by providing authentication during login. In essence, authentication indicia, such as the conference number and password, are retrieved from the user via the voice connection, and similarly retrieved through the multimedia session via the user's multimedia client 22 to create the proper association between the audio portion of the conference with the multimedia portion of the conference. An exemplary process is provided in FIGS. 3A and 3B. The communication flow diagram illustrates the registration of the multimedia bridge 32 and multimedia client A (22), and a login procedure for user A, who is associated with telephone A (12) and multimedia client A (22).

Initially, the multimedia bridge 32 will send a SIP REGISTER message to service node B (28) identifying the directory number for the audio bridge 14 and the address for the multimedia bridge 32 (step 300). Service node B (28) will send a SIP REGISTER message providing the same information to the multimedia client database 30 (step 302), which will store the information to provide the necessary association between the audio bridge 14 and the multimedia bridge 32. Multimedia client A (22) will send its address along with the directory number for telephone A (12) to service node A (28) (step 304), which will send a SIP REGISTER message with the same information to multimedia client database 30 to effectively associate telephone A (12) and multimedia client A (22) (step 306).

At this point, assume that user A desires to log into a conference call, which will have a multimedia component. User A will pick up telephone A (12) and dial the directory number for the audio bridge 14, which will result in DTMF digits being sent to telephony switch A (16) (step 308), which will send an ISUP IAM message identifying the directory number for the caller and the called audio bridge 14 to telephony switch B (16) (step 310). Telephony switch B (16) will send a termination attempt trigger providing a transaction ID and the directory numbers for telephone A (12) and the audio bridge 14 to service node B (28) (step 312), which will reply to telephony switch B (16) with an IN continue message to instruct telephony switch B (16) to take the necessary steps to establish a voice session between telephone A (12) and audio bridge 14 (step 314). Thus, telephony switch B (16) will send a PRI setup message identifying the directory numbers for telephone A (12) and the audio bridge 14 to the audio bridge 14 (step 316), which will respond with a PRI alerting message (step 318). Telephony switch B (16) will send an ISUP ACM message to telephony switch A (16) indicating the call is being processed and is waiting to be answered (step 320). Once the audio bridge 14 is connected, it will send a PRI connect message to telephony switch B (16) (step 322), which will send an ISUP ANS message to telephony switch A (16) (step 324). At this point, a voice connection between telephone A (12) and the audio bridge 14 is established (step 326).

Through this voice connection, the audio bridge 14 can query user A for authentication indicia, such as a conference number and/or password associated with the particular conference (steps 328 and 330). At this point, the audio bridge 14 will have the authentication indicia, such as the conference number and password of the user, and will determine whether the user is authorized to participate in the conference. Meanwhile, service node B (28) will send a SIP INVITE message including the directory number for telephone A (12) and the call identification to the multimedia client database 30 to retrieve the address for multimedia client A (22) (step 332). The multimedia client database 30 will send a SIP 300 message to service node B (28) to redirect the session (step 334). The SIP 300 message will include the directory number for telephone A (12) and the address for multimedia client A (22). Service node B (28) will then send a SIP MESSAGE message to the multimedia bridge 32 indicating there is an incoming call to the conference and providing the address for multimedia client A (22) and the directory number for telephone A (12) (step 336).

As described above, the multimedia bridge 32 will initially send a SIP MESSAGE message to multimedia client A (22) in response to user A's call providing the directory number for the audio bridge 14 and the address for the multimedia bridge 32 (step 338). For authentication of the multimedia session, the multimedia bridge 32 may be configured to send another SIP MESSAGE message to multimedia client A (22) using the address recovered by service node B (28) to request authentication, such as asking user A to provide authentication indicia via multimedia client A (22) (step 340). Notably, the authentication indicia for the multimedia session may be the same as or different from that used for the voice session. Preferably, multimedia client A (22) will recognize the request and automatically query the user to enter the authentication indicia, such as the conference number and password, and as such, multimedia client A (22) can send a SIP MESSAGE message back to the multimedia bridge 32 providing the authentication indicia (step 342). The message will be directed to the address for the multimedia bridge 32 and associated with the conference, if necessary. Thus, user A can be made to authenticate himself for both the voice and multimedia sessions, for security purposes as well as to allow the audio bridge 14 and multimedia bridge 32 to properly associate the conferences, since each device or system will preferably be configured to handle multiple conferences involving different parties at any given time.

Figure 4A:
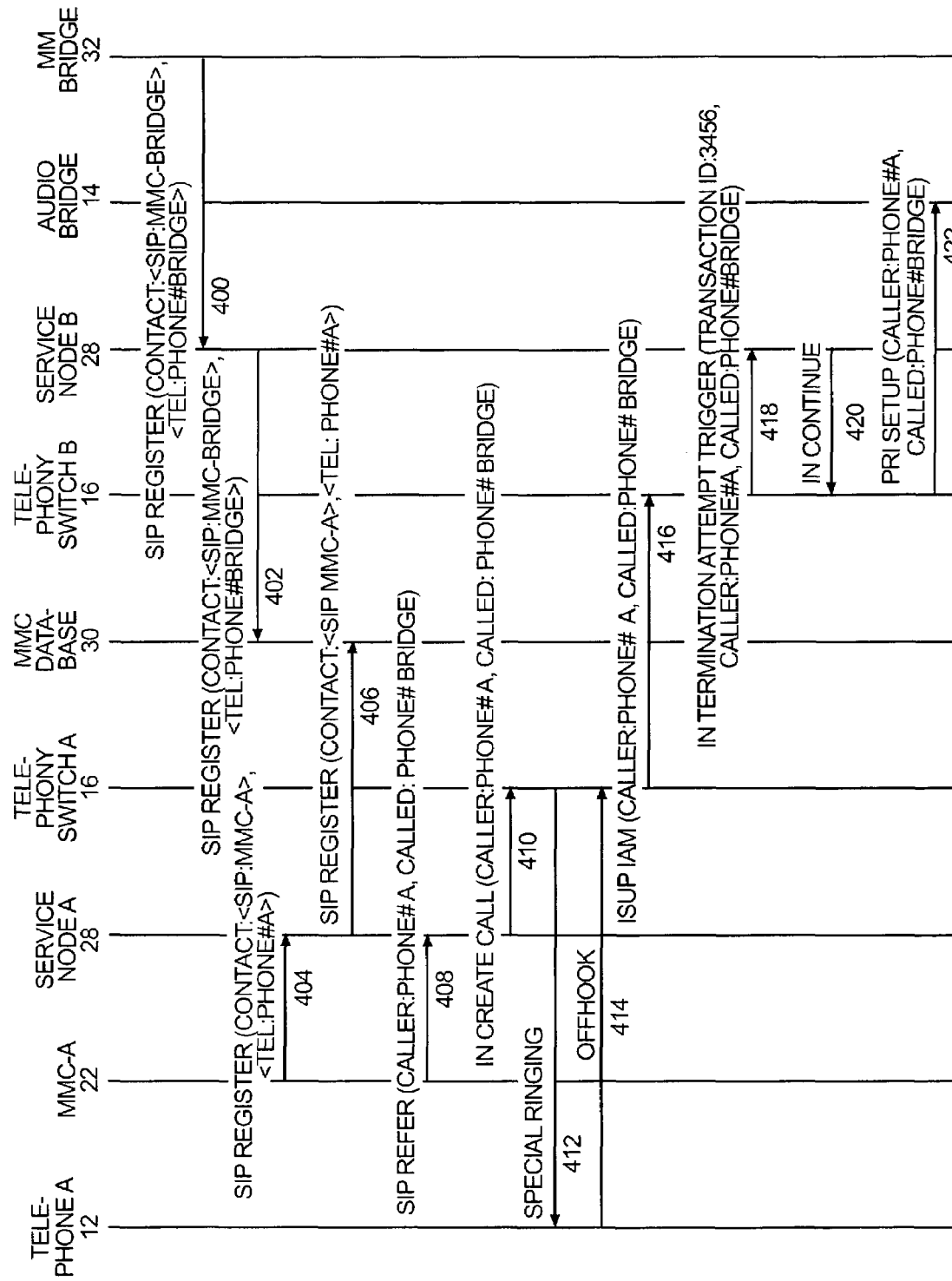
Figure 4B:
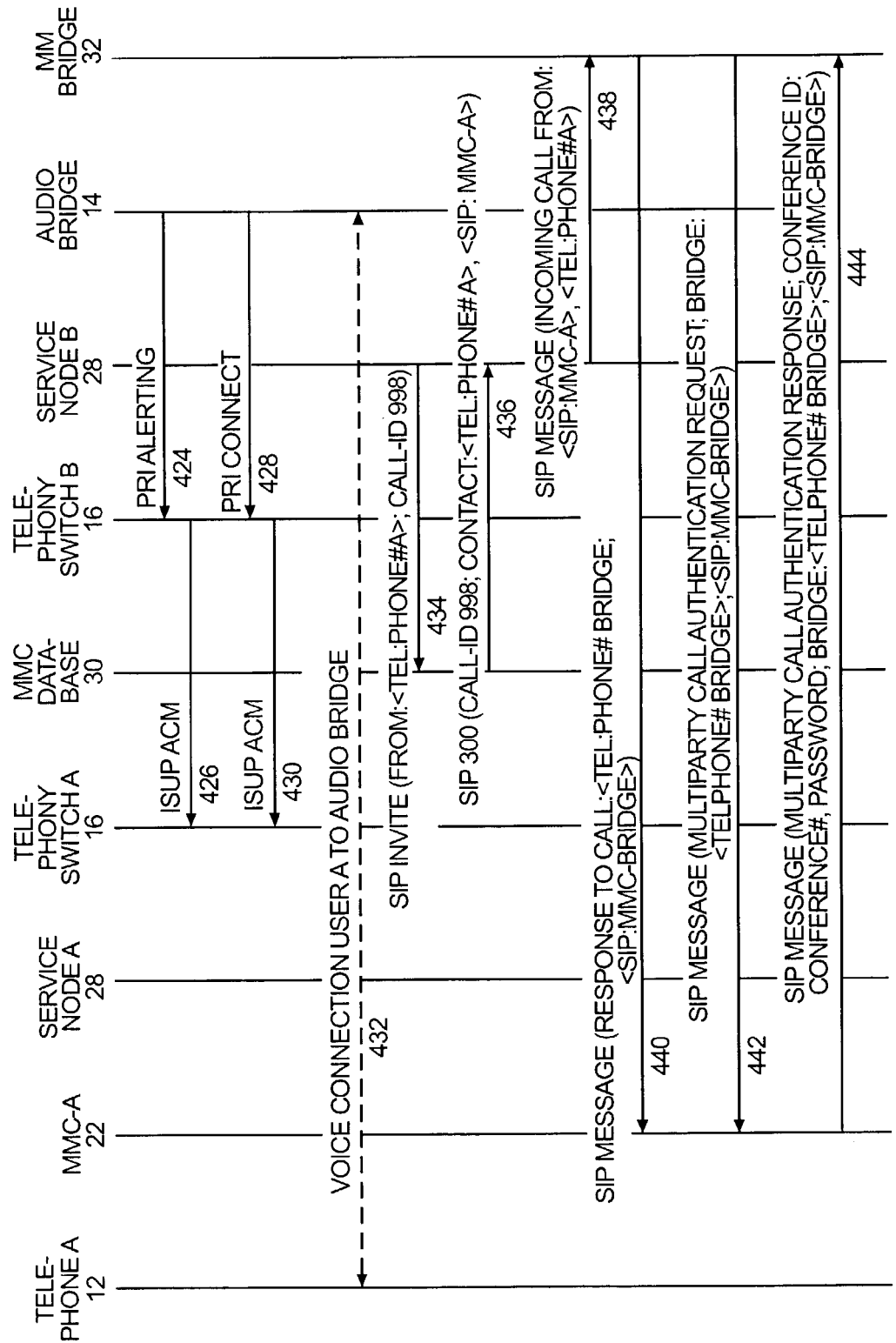
Figure 4C:
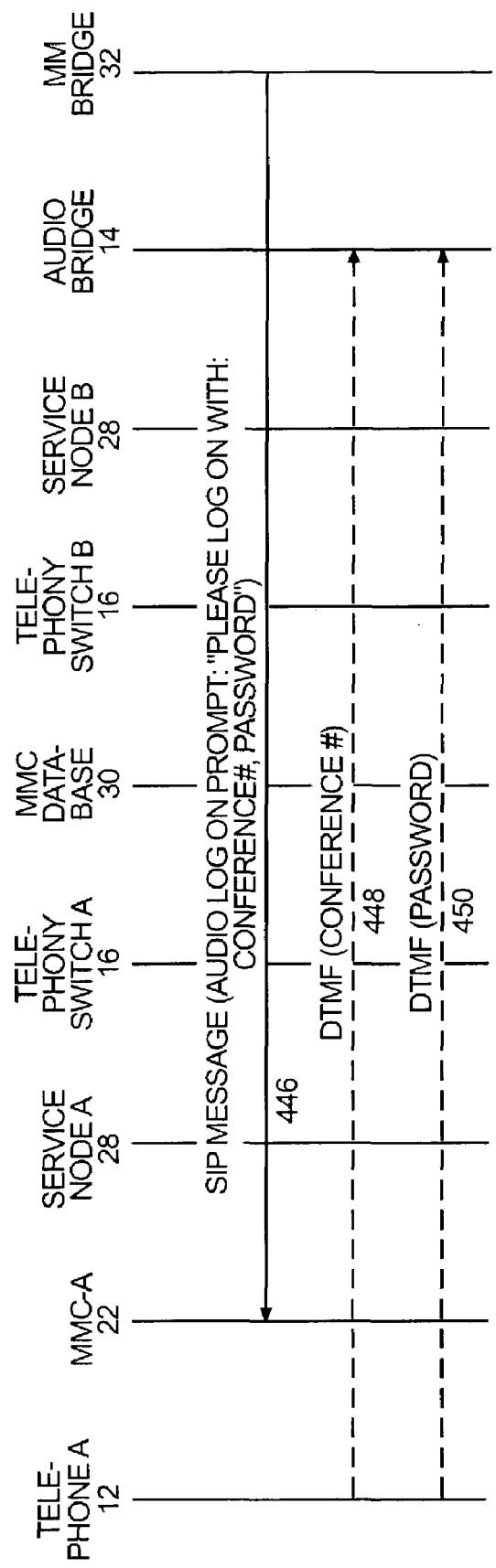

Another aspect of the present invention provides the option for initiating the voice session for a conference call from one of the multimedia clients 22, even though the voice session is conducted through its associated telephone 12. In the following example, multimedia client A (22) may be used to trigger the voice session via telephone A (12). An exemplary communication flow is provided in FIGS. 4A-4C.

Initially, the multimedia bridge 32 and multimedia client A (22) will register their respective associations with the audio bridge 14 and telephone A (12) with the multimedia client database 30 via service nodes A and B (28) as described above (steps 400-406). When user A wants to initiate the voice session of the conference, he will trigger multimedia client A (22) to send a SIP REFER message to service node A (28) identifying the directory number for associated telephone A (12) and the directory number for the audio bridge 14, which will facilitate the conference (step 408). Service node A (28) will send an IN create call message to telephony switch A (16) to initiate a call from telephone A (12) to the audio bridge 14 using the directory number for telephone A (12) and the directory number for the audio bridge 14 (step 410). Telephony switch A (16) will respond by sending a special ringing signal to telephone A (12) (step 412), and when user A answers, telephone A (12) will send an offhook indication back to telephony switch A (16) (step 414). Telephony switch A (16) will then send an ISUP IAM message to telephony switch B (16) identifying the directory numbers for telephone A (12), the caller, and the directory number for the audio bridge 14, the called party (step 416). Telephony switch B (16) will send a termination attempt trigger to service node B (28) to alert service node B (28) of the call and provide the directory numbers for telephone A (12) and the audio bridge 14, along with a transaction ID (step 418). Service node B (28) will respond with an IN continue message (step 420), which will trigger telephony switch B (16) to send a PRI setup message including the directory numbers for telephone A (12) and the audio bridge 14 to the audio bridge 14 (step 422). The audio bridge 14 will respond with a PRI alerting message (step 424), which will cause telephony switch B (16) to send an ISUP ACM message to telephony switch A (16) (step 426). Once the audio bridge 14 connects, it will send a PRI connect message to telephony switch B (16) (step 428), which will send an ISUP ANS message to telephony switch A (16) (step 430). At this point, a voice connection between telephone A (12) and the audio bridge 14 is established (step 432).

As with the above, service node B (28) will take the necessary steps using the directory number for telephone A (12) to identify an address for multimedia client A (22) by sending a SIP INVITE message to the multimedia client database 30 (step 434). The multimedia client database 30 will look up the address for multimedia client A (22) based on the directory number for telephone A (12) and respond with a SIP 300 message providing such information to service node B (28) (step 436). Service node B (28) will send a SIP MESSAGE message to the multimedia bridge 32 identifying the address for multimedia client A (22) and the directory number for telephone A (12) (step 438). As described above, the multimedia bridge 32 will send a SIP MESSAGE message identifying the directory number for the audio bridge 14 and the address for the multimedia bridge 32 to multimedia client A (22) using the recently retrieved address for multimedia client A (22) (step 440). If the audio bridge is configured to handle only one audio conference for a given directory number, no further steps are necessary. If the audio bridge is configured to handle multiple audio conferences with a given directory number, the following steps are taken. The multimedia bridge 32 will send a SIP MESSAGE message to request the authentication indicia for the conference (step 442). Multimedia client A will respond with the authentication indicia, such as the conference number and password, to the multimedia bridge 32 (step 444). At this point, the multimedia bridge 32 may be configured to send a reminder to user A via multimedia client A (22) to provide the authentication indicia for the voice session by sending a SIP MESSAGE message with a text prompt to be displayed to the user, such as, "Please log on with: your conference number and password," (step 446). User A at this point can speak or dial the conference number and password via telephone A (12), which will be received by the audio bridge 14 to authenticate the voice session and allow the audio bridge 14 to connect user A to the conference (steps 448 and 450).

Figure 6:
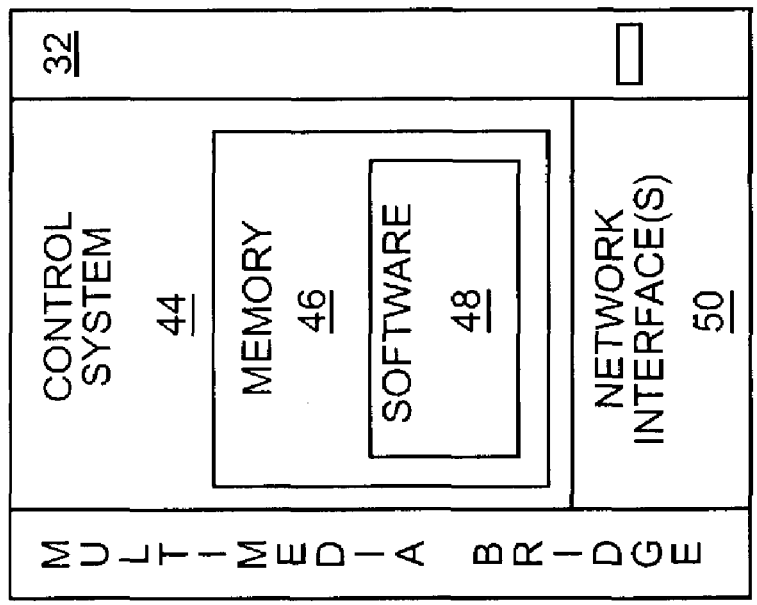
FIG. 6 is a block representation of a multimedia bridge according to one embodiment of the present invention.
Figure 5:
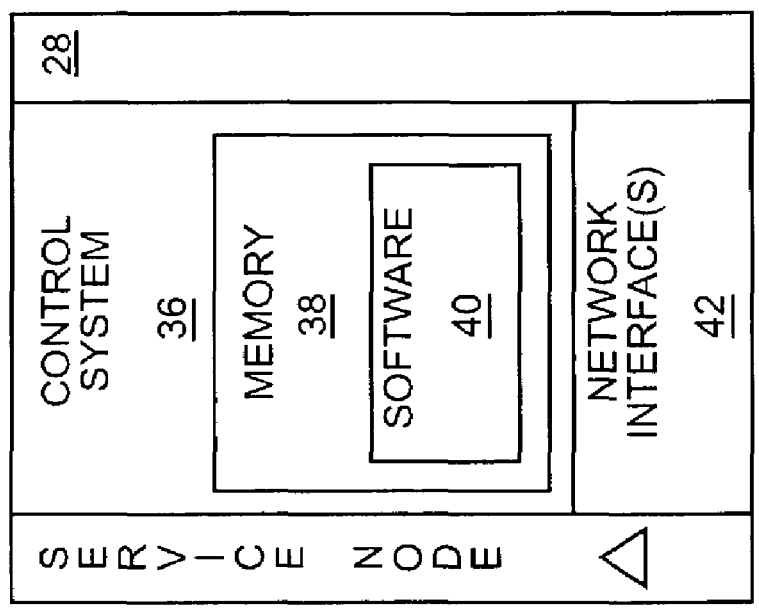
FIG. 5 is a block representation of a service node according to one embodiment of the present invention.

With reference to FIG. 5, an exemplary service node architecture is illustrated as including a control system 36 with sufficient memory 38 to allow software 40 to carry out the functionality described above. The control system 36 may be associated with one or more network interfaces 42 to facilitate communications with the various multimedia clients 22, multimedia bridge 32, or telephony switches 16. With reference to FIG. 6, a multimedia bridge 32 is preferably configured to include a control system 44 having sufficient memory 46 for software 48, which is capable of carrying out the functionality described above. The control system 44 may also be associated with one or more network interfaces 50 to facilitate communications with the service node 28 and multimedia clients 22. The control system 44 may include or otherwise provide a dedicated media processing architecture for processing-intensive functions, such as video multicast.

Those skilled in the art will recognize improvements and modifications to the preferred embodiments of the present invention. All such improvements and modifications are considered within the scope of the concepts disclosed herein and the claims that follow.

What is claimed is:

1. A method for associating multimedia sessions with conference calls comprising:
   a) receiving, upon detection that a first telephony device has multimedia capabilities, a first address for a first multimedia client upon initiation of a first call from the first telephony device to an audio bridge, the first telephony device and first multimedia client associated with a first participant of a conference call provided by the audio bridge; and
   b) sending a multimedia bridge address for a multimedia bridge, which is associated with the audio bridge, to the first multimedia client using the first address.

2. The method of claim 1 wherein the first address is received from a service node associated with the multimedia bridge, the service node obtaining the first address based on a first directory number associated with the first telephony device.

3. The method of claim 1 further comprising receiving a second address for a second multimedia client upon initiation of a second call from a second telephony device to the audio bridge, the second telephony device and second multimedia client associated with a second participant of the conference call provided by the audio bridge.

4. The method of claim 3 further comprising sending the multimedia bridge address for the multimedia bridge to the second multimedia client using the second address.

5. The method of claim 3 further comprising sending the second address to the first address.

6. The method of claim 5 further comprising sending the first address to the second address.

7. The method of claim 3 wherein the first and second participants are participants in the conference call and further comprising recognizing a change in participants in the conference call and sending messages indicative of the change in participants to the first and second addresses.

8. The method of claim 7 wherein the messages are further indicative of the change in a participant who is participating only via a telephony device.

9. The method of claim 3 wherein the first and second participants are participants in the conference call and further comprising recognizing a change in media capability provided by a multimedia client associated with a participant in the conference call and sending messages indicative of the change in media capability to the first and second addresses.

10. The method of claim 3 further comprising recognizing the second participant has ended participation in the conference call and sending a first message to the first address indicative of the second participant ending participation in the conference call.

11. The method of claim 10 further comprising sending a second message to the second address indicative of the second participant ending participation in the conference call.

12. The method of claim 3 further comprising recognizing an end of the conference call and sending messages summarizing the conference call to the first and second addresses.

13. The method of claim 3 further comprising sending a first directory number for the first telephony device and a second directory number for the second telephony device to the first and second addresses.

14. The method of claim 3 further comprising facilitating a media session between the first and second multimedia clients.

15. The method of claim 1 further comprising sending a bridge access number for the audio bridge to the first address.

16. The method of claim 1 further comprising facilitating a media session with the first multimedia client.

17. The method of claim 16 wherein the media session relates to one of the group consisting of instant messaging, screen sharing, streaming media, video, application sharing and file transfer.

18. The method of claim 1 further comprising sending a media address to the first address wherein the media address defines a location of content associated with a media session and the first multimedia client can use the media address to access the content.

19. The method of claim 18 further comprising receiving a request for the media session, accessing the content, and storing the content at the media address.

20. The method of claim 1 further comprising:
  c) receiving authentication indicia pertaining to the conference call from the first multimedia client; and
  d) authenticating the first multimedia client to participate in association with the conference call based on the authentication indicia.

21. The method of claim 20 further comprising sending a message to the first multimedia client with instructions to log into the conference call via the first telephony device.

22. A system for associating multimedia sessions with conference calls comprising:
  a) an interface; and
  b) a control system associated with the interface and adapted to:
    i) receive, upon detection that a first telephony device has multimedia capabilities, a first address for a first multimedia client upon initiation of a first call from the first telephony device to an audio bridge, the first telephony device and first multimedia client associated with a first participant of a conference call provided by the audio bridge; and
    ii) send a multimedia bridge address for a multimedia bridge, which is associated with the audio bridge, to the first multimedia client using the first address.

23. The system of claim 22 wherein the first address is received from a service node associated with the multimedia bridge, the service node obtaining the first address based on a first directory number associated with the first telephony device.

24. The system of claim 22 wherein the control system is further adapted to receive a second address for a second multimedia client upon initiation of a second call from a second telephony device to the audio bridge, the second telephony device and second multimedia client associated with a second participant of the conference call provided by the audio bridge.

25. The system of claim 24 wherein the control system is further adapted to send the multimedia bridge address for the multimedia bridge to the second multimedia client using the second address.

26. The system of claim 24 wherein the control system is further adapted to send the second address to the first address.

27. The system of claim 26 wherein the control system is further adapted to send the first address to the second address.

28. The system of claim 24 wherein the first and second participants are participants in the conference call and wherein the control system is further adapted to recognize a change in participants in the conference call and send messages indicative of the change in participants to the first and second addresses.

29. The system of claim 28 wherein the messages are further indicative of the change in a participant who is participating only via a telephony device.

30. The system of claim 24 wherein the first and second participants are participants in the conference call and wherein the control system is further adapted to recognize a change in media capability provided by a multimedia client associated with a participant in the conference call and send messages indicative of the change in media capability to the first and second addresses.

31. The system of claim 24 wherein the control system is further adapted to recognize the second participant has ended participation in the conference call and send a first message to the first address indicative of the second participant ending participation in the conference call.

32. The system of claim 31 wherein the control system is further adapted to send a second message to the second address indicative of the second participant ending participation in the conference call.

33. The system of claim 24 wherein the control system is further adapted to recognize an end of the conference call and send messages summarizing the conference call to the first and second addresses.

34. The system of claim 24 wherein the control system is further adapted to send a first directory number for the first telephony device and a second directory number for the second telephony device to the first and second addresses.

35. The system of claim 24 wherein the control system is further adapted to facilitate a media session between the first and second multimedia clients.

36. The system of claim 22 wherein the control system is further adapted to send a bridge directory number for the audio bridge to the first address.

37. The system of claim 22 wherein the control system is further adapted to facilitate a media session with the first multimedia client.

38. The system of claim 37 wherein the media session relates to one of the group consisting of instant messaging, screen sharing, streaming media, and file transfer.

39. The system of claim 22 wherein the control system is further adapted to send a media address to the first address wherein the media address defines a location of content associated with a media session and the first multimedia client can use the media address to access the content.

40. The system of claim 39 wherein the control system is further adapted to receive a request for the media session, access the content, and store the content at the media address.

41. The system of claim 22 wherein the control system is further adapted to:
  iii) receive authentication indicia pertaining to the conference call from the first multimedia client; and
  iv) authenticate the first multimedia client to participate in association with the conference call based on the authentication indicia.

42. The system of claim 41 wherein the control system is further adapted to send a message to the first multimedia client with instructions to log into the conference call via the first telephony device.

* * * * *